United States Patent
Maichel

(10) Patent No.: US 10,612,672 B2
(45) Date of Patent: Apr. 7, 2020

(54) PIPELINE CONTROL UNIT

(71) Applicant: Jeffrey L. Maichel, Murrieta, CA (US)

(72) Inventor: Jeffrey L. Maichel, Murrieta, CA (US)

( * ) Notice: Subject to any disclaimer, the term of this patent is extended or adjusted under 35 U.S.C. 154(b) by 0 days.

(21) Appl. No.: 16/019,526

(22) Filed: Jun. 26, 2018

(65) Prior Publication Data

US 2018/0372231 A1    Dec. 27, 2018

Related U.S. Application Data

(60) Provisional application No. 62/525,093, filed on Jun. 26, 2017.

(51) Int. Cl.
| | |
|---|---|
| *F16K 3/02* | (2006.01) |
| *F16K 27/04* | (2006.01) |
| *F16K 43/00* | (2006.01) |
| *F16L 55/105* | (2006.01) |

(52) U.S. Cl.
CPC .......... *F16K 3/0281* (2013.01); *F16K 3/0263* (2013.01); *F16K 3/0272* (2013.01); *F16K 27/044* (2013.01); *F16K 43/00* (2013.01); *F16L 55/105* (2013.01)

(58) Field of Classification Search
CPC .... F16L 55/105; F16K 3/0281; F16K 3/0272; F16K 27/044; F16K 3/20
See application file for complete search history.

(56) References Cited

U.S. PATENT DOCUMENTS

| | | | | |
|---|---|---|---|---|
| 1,833,700 A | * | 11/1931 | Wolf | ........................ F16K 3/28 |
| | | | | 29/213.1 |
| 3,908,691 A | | 9/1975 | Coughlin | |
| 3,948,282 A | | 4/1976 | Yano | |
| 4,332,272 A | | 6/1982 | Wendell | |
| 4,372,531 A | * | 2/1983 | Rollins | ..................... F16F 1/32 |
| | | | | 251/174 |
| 4,436,283 A | * | 3/1984 | Shore | ........................ F16K 3/20 |
| | | | | 251/174 |
| 4,527,586 A | | 7/1985 | Yano et al. | |
| 5,330,158 A | * | 7/1994 | Ellich | ................... F16K 3/0281 |
| | | | | 251/327 |
| 5,611,365 A | | 3/1997 | Maichel | |
| 5,660,199 A | | 8/1997 | Maichel | |
| 5,732,728 A | | 3/1998 | Maichel | |
| 6,041,806 A | | 3/2000 | Maichel | |
| 6,164,622 A | | 12/2000 | Partridge | |
| 6,530,389 B2 | * | 3/2003 | Sato | ........................ F16L 41/06 |
| | | | | 137/15.14 |

(Continued)

FOREIGN PATENT DOCUMENTS

JP    2007177945 A    7/2007

*Primary Examiner* — Reinaldo Sanchez-Medina
*Assistant Examiner* — David Colon-Morales
(74) *Attorney, Agent, or Firm* — Loza & Loza, LLP; Michael F. Fedrick

(57) ABSTRACT

A pipeline control unit that joins pipeline conduits and has a housing with an interior compartment for receiving a gate. A valve servicing assembly or pressure plates can be installed onto the housing to form a fluid tight structure to allow removal and replacement of a retained gate without depressurizing a pipeline system. Strongbacks attached to the housing can compress lateral walls of the housing to secure a gate in the interior compartment, and removal of such compression allows removal of the gate while the pipeline is pressurized.

15 Claims, 14 Drawing Sheets

(56) References Cited

U.S. PATENT DOCUMENTS

| | | |
|---|---|---|
| 6,776,184 B1 | 8/2004 | Maichel et al. |
| 6,983,759 B2 | 1/2006 | Maichel et al. |
| 7,021,325 B2 | 4/2006 | Maichel et al. |
| 7,225,827 B2 | 6/2007 | Maichel et al. |
| 9,004,095 B2 | 4/2015 | Maichel |
| 2009/0140195 A1 | 6/2009 | Shibata et al. |
| 2009/0260695 A1 | 10/2009 | France et al. |
| 2018/0363786 A1* | 12/2018 | Sundrla ................ F16K 3/0281 |
| 2019/0316724 A1* | 10/2019 | Aamodt ................ F16L 55/105 |

* cited by examiner

PIPELINE CONTROL UNIT

BACKGROUND

Technical Field

The present invention relates generally to a rigid and flexible housing that retains various gates without being submerged in a pressurized "mother-valve" or fluid-retaining container during their useful lives. This structure can support a gate, secure it and release it by flexing the structure's sidewalls by operating external tensioning means. Various gates can be installed, such as a butterfly valve, a directional-flow mechanism, an orifice plate/conduit spacer, a gate or stop plate, or a protection-screen in fluid tight arrangement in lines carrying water, sewer, natural gas, or other fluids. The present housing can allow such gates to be replaced under pressure without first shutting down the line. If a line can be easily depressurized or shut down, this assembly can also aid in quick removal and installation of a gate by hand.

Description of Related Art

U.S. Pat. No. 9,004,095, entitled "Flange Support Structure for Pipeline Controls that Allows Repair," discloses a pipeline control structure that connects two conduits with a support structure. This structure can support many different gates such as a butterfly valve, directional-flow mechanism, an orifice plate/conduit-spacer, a plate and/or a protection-screen in fluid tight arrangement in lines carrying water, sewer, natural gas, or other fluids. The flange structure can allow such gates to be replaced under pressure without first shutting down the line. In the structure of U.S. Pat. No. 9,004,095, a mating wedge configuration is used to seal the gate with the valve structure when forced together and locked in position with downward pressure and added set screws to secure mechanisms once pressure plates are removed.

In this wedged seal configuration, any debris caught between the wedged surfaces can limit the completion of the movement required to seal and may allow fluid to escape. Restraining the gate is achieved by bolting tabs on the wedge plate to the metal housing.

Another sealing method uses O-rings or soft sealing materials to seal between the gate and the valve structure. When slid together in tight engagement, O-rings seal the mating surfaces but do not allow tightening if a leak were to develop between these surfaces.

SUMMARY

The present invention relates to a pipeline control unit that includes a housing for connection to fluid conduits and supports a removable gate such as a butterfly valve or other gates that for example can be a check valve, a flow-through cartridge, a butterfly valve, a plug, a ball valve, an orifice plate, a gate/plate or a protection screen. Using this improved restraining mechanism enables a user to externally apply and release compression to the flexible housing wall to hold a gate and seal the gate in a similar way to a normal valve flange connection without relying on sliding of seals or wedging with the structures surfaces to accomplish fluid tight engagement between these members.

The invention provides positive compression that retains the gate in place. By providing a moving member incorporated within one or both external structures the seating surfaces can provide a controlled movement to move the flexible structure inward gripping and sealing the gate to the valve structure. When the member is loosened, the tension is removed so the flexible structure moves to a relaxed position allowing the gate to be easily removed.

Using flexible materials such as polyethylene (e.g., HDPE), PVC, composites, plastics, rubber and some metals for the seating structure along with a rigid outside frame (strongback) gives this improved method a structure that can support the pipeline control unit, withstand the pipeline pressure and provide internal walls that are flexible so when tension is applied by components adapted with the rigid frame the structure's walls can move inwards to restrain the gate in fluid tight engagement, and when retracted, releases the gate from the structure if desired. By releasing the tension using the support structure and traveling member combination, the gate can be released from the housing for removal, repair or replacement.

The valve's housing preferably includes a first side having a first connected conduit with an opening for connection to a first pipeline conduit and a second side having a second connected conduit with an opening for connection to a second pipeline conduit. In one embodiment, the first and second sides can be formed on a first plate connected to a conduit and a second plate connected to a conduit, the first and second plates are joined and can incorporate rigid end members that may be rigid to allow space for a gate. Between the first and second sides of the housing, and between such the flexible internal walls, is the interior compartment that extends between the first and second openings where the gate can be installed. The internal walls made of a flexible material are externally supported by lateral rigid material used as a strongback to restrain the flexible material when fluid pressure is presented from the pipeline, this combination contains pressurized fluids when present within the valves housing. The strongback incorporates a traveling member that is positioned around one or both connected conduits and rest against the exterior of the flexible internal walls. The traveling members sit flush against the exterior of the internal flexible walls and in line with the strongback.

The traveling member can be advanced by use of rotating screws that are either attached and threaded through the strongback, or threaded to the traveling member and pass through the strongback to achieve movement of the traveling member. Advancing the screws moves the traveling member and the flexible internal wall inward to reduce the width of the interior compartment. This movement engages and seals the gate with the structure's internal flexible walls. When rotating these screws in a reverse direction, the traveling member tension is removed so the gate is no longer compressed with the flexible internal walls and the gate can be removed and no longer in fluid tight engagement.

On opposite sides of the first and second sides are lateral rigid walls. The housing also includes two access service openings, referred to for convenience as an upper access opening and a lower access opening, though orientations other than "upper" and "lower" are included within such terminology.

The upper access opening and the lower access opening can be used to install or remove a gate. The pipeline housing of the present invention provides fluid communication between the first and second openings of the housing when the gate is removed from the housing. The gate is generally installed through one of the openings, such as through the upper access opening, and can be installed in fluid tight engagement with the interior compartment of the housing.

The interior compartment of the housing comprises a first interior face in communication with the first opening and a second interior face in communication with the second opening. In such embodiments, the gate can comprise a first face for engaging the first interior face of the interior compartment in a fluid tight manner and a second face for engaging the second interior face of the interior compartment in a fluid tight manner.

In order to maintain pressure within the pipeline system during the change or repair of the gate, a cover plate (which may be formed from one or more constituent parts) is reversibly secured in a fluid tight manner to the lower access opening. The upper access opening can be likewise reversibly secured in a fluid tight manner with an isolation valve and a hollow cover assembly. This allows the gate to be installed or removed from the housing through such an isolation valve assembly when the cover plate and isolation valve assembly are connected to the housing, without interrupting a flow of fluid between the first and second openings. The cover plate and isolation valve can be reversibly secured to their respective component of the present pipeline control unit with one or more connectors, such as flanges and/or threaded screw connectors.

The isolation valve assembly fitted to the present pipeline control unit can, in one embodiment, comprise a slide gate comprising a moveable gate barrier and a receptacle for receiving the gate barrier. A cover assembly can then be secured to the upper side of the isolation valve assembly, with the cover assembly comprising a hollow interior for retaining the gate and a mechanism, such as a gate-advancing mechanism, for attachment to the gate. The gate-advancing mechanism is operable to conduct the gate into the hollow interior of the cover assembly, when the gate is in need of repair or replacement, for example.

A further aspect of the present invention is a method for removing a gate as described above under pressure. In this method, a cover plate is attached in a fluid tight manner to the lower access opening and an isolation valve assembly is likewise attached to the upper access opening in a fluid tight manner. The isolation valve assembly includes a gate attached to the upper access opening, for creating a fluid tight seal, as well as a cover assembly attached to the gate. The cover assembly includes a hollow interior for retaining the gate. Once these components have been attached to the housing, the tension caused by the traveling member between the housing and the gate is retracted to remove compression so the gate can be removed through the upper access opening and into the cover assembly. The gate of the isolation valve assembly can then be closed to create a fluid tight seal.

In this way, the pipeline of which the present pipeline control unit is a part can continue to operate under pressure, while the cover assembly can be depressurized and opened in order to remove the gate for replacement or repair. After removing the gate from the cover assembly, a new or repaired gate can be placed within it, which is reinstalled onto the upper access opening. The gate of the isolation valve assembly can then be opened, and the new or repaired pipeline control gate can be conducted from the interior of the cover assembly, through the gate and the upper access opening, and into the housing while the system is still pressurized. The gate can then be restrained in position with the interior compartment of the housing and by rotating the screws on the strongback to advance a traveling member to compresses the flexible walls against the gate to restrain and seal into a fluid tight position.

Once this is accomplished, the isolation valve assembly either remains in place or preferably removed from the upper access opening of the pipeline control unit. The cover plate can likewise be disconnected from the lower access opening of the pipeline control unit and removed, or can be left in place.

DRAWINGS

FIG. 1 is a side sectional view depicting the present pipeline control unit holding a butterfly gate within the valve housing. As shown, the traveling members (25, 26) are not advanced by the screws 22, so the gate 12 is not restrained or in fluid tight arrangement.

FIG. 2A is a side sectional view of a directional flow device or "check-valve" gate installed into the housing. This gate is shown in the closed position due to incorrect flow direction. The directional flow device can be removed, replaced or reinstalled into the housing and can be secured by the traveling member.

Figure 3:
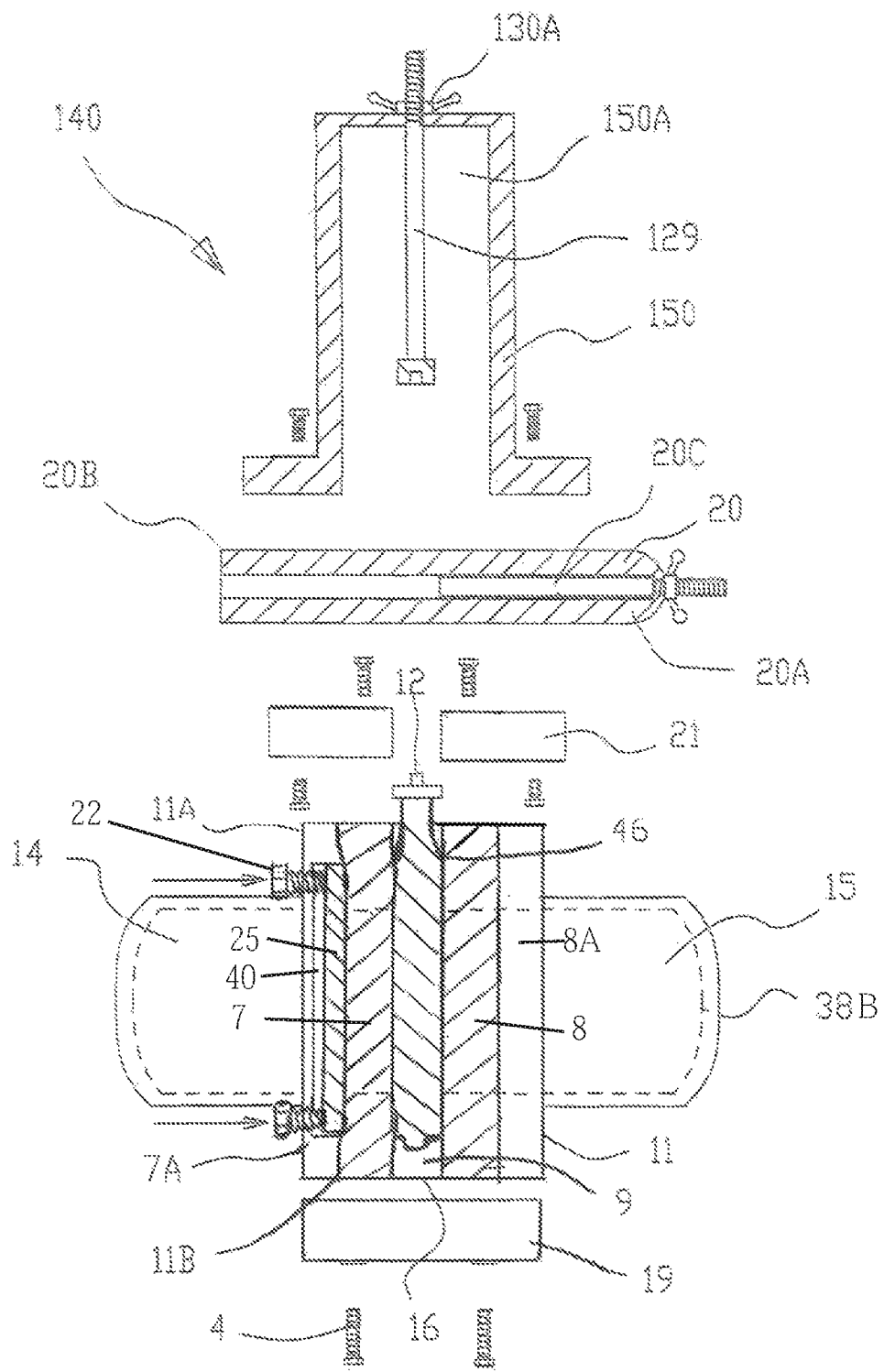

FIG. 3 is an exploded, side sectional view of the present pipeline control unit showing added components that can allow pressurization of the housing to perform servicing operations. The traveling member is shown to be in the advanced or restraining position by arrows pointing in the direction of the movement of screws 22. In this position, the gate is restrained and in fluid tight engagement with the housing.

Figure 4:
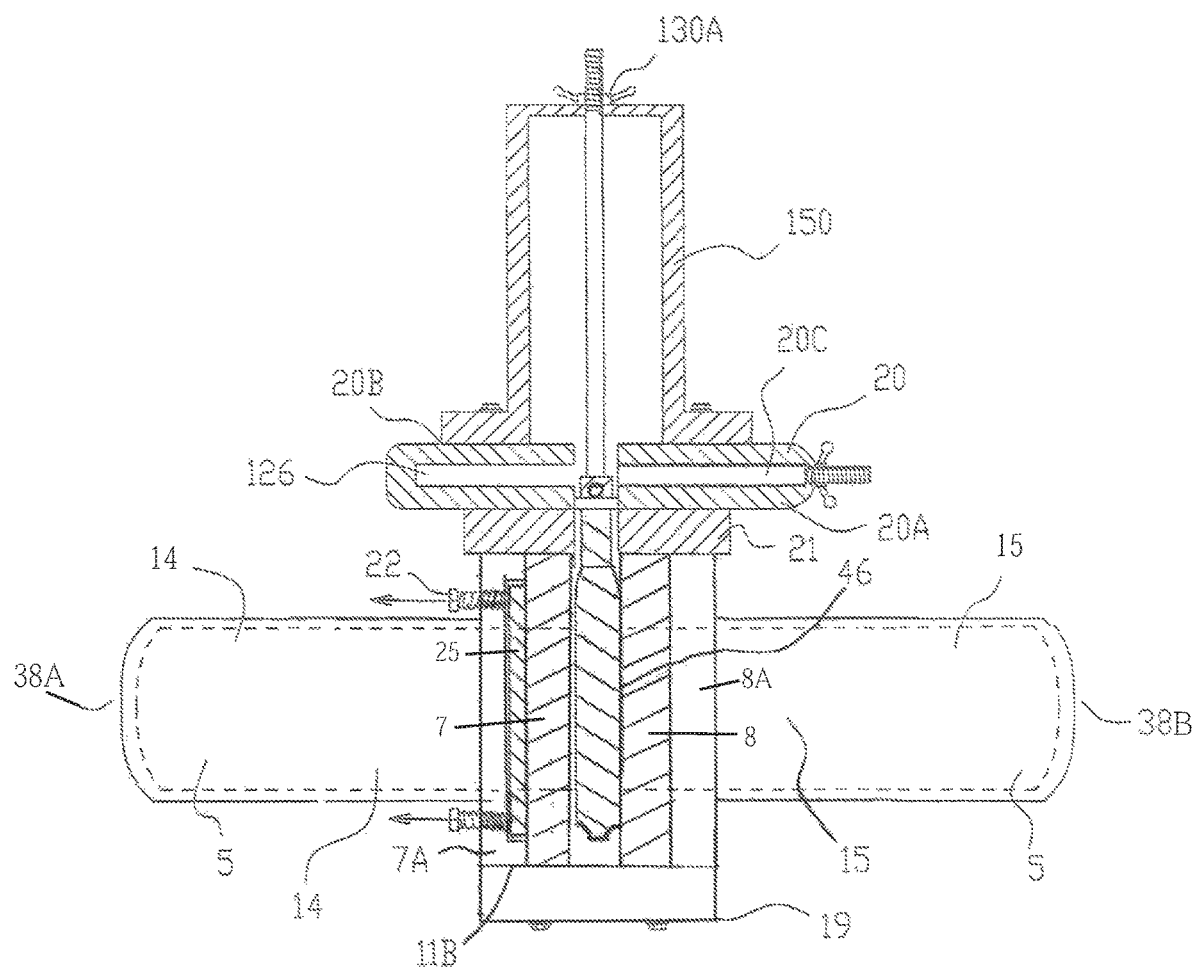

FIG. 4 is a side sectional view of the pipeline control unit of FIG. 3 in an assembled configuration. Using an intermediate mounting flange 21, an isolation valve assembly can be selectively mounted over one access opening (the upper access opening in this figure) with a chamber above the opening and a cover plate 19 over the lower access opening. A service assembly retraction mechanism is attached to the pipeline control unit to remove the gate from its position. FIG. 4 also illustrates the traveling member in the retracted or non-restraining position by arrows pointing in the direction of the screws' movement. In this position the gate is not restrained and not in fluid tight engagement with the housing, making removal of the gate possible.

Figure 5:
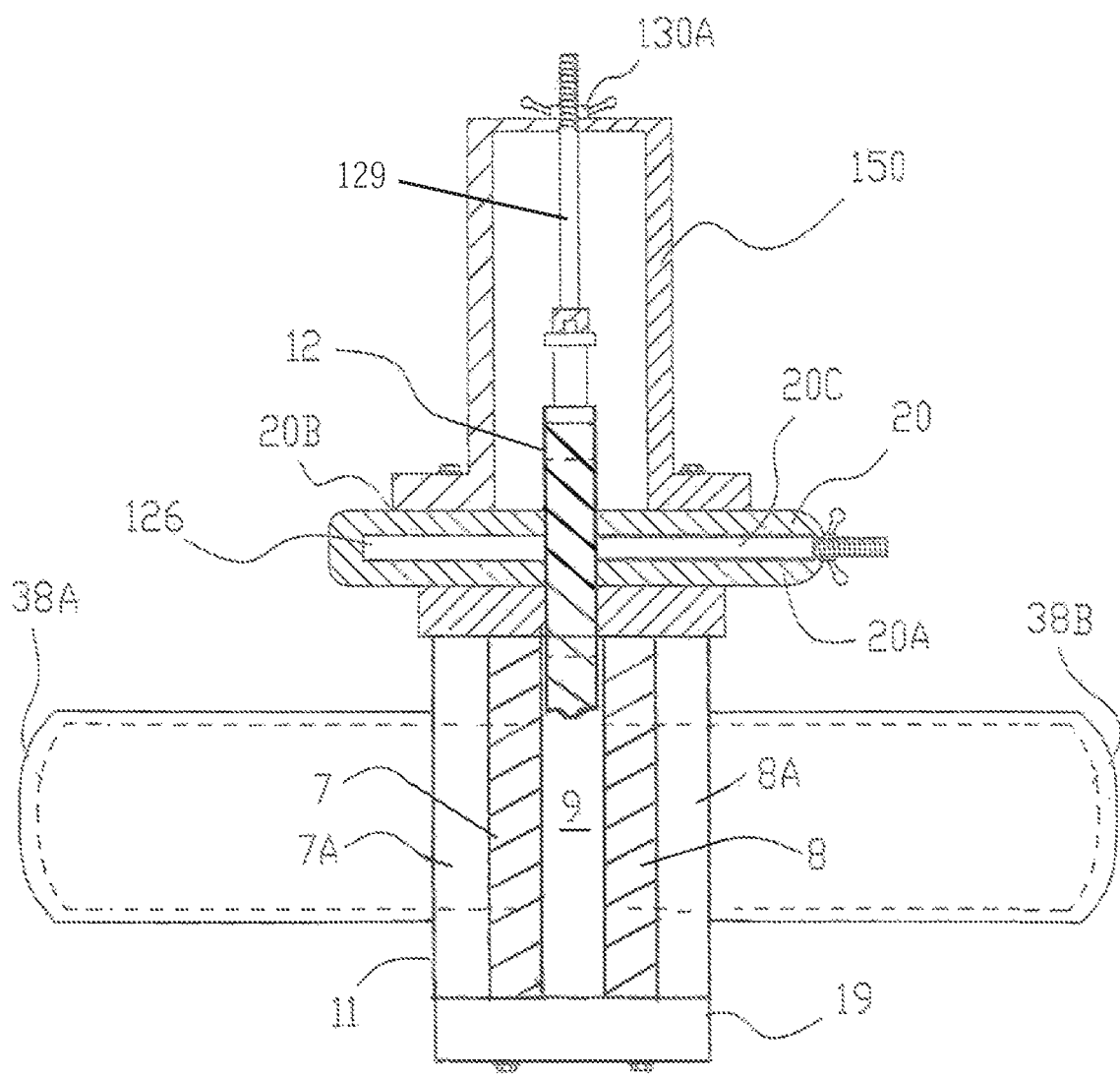

FIG. 5 is a side sectional view of the pipeline control unit of FIG. 3 in an assembled configuration. A cover plate is selectively mounted over the lower access opening and an isolation valve assembly is selectively mounted over the upper access opening, with a chamber above the upper access opening and a service assembly retraction mechanism attached to the pipeline control unit retracting the gate from the housing while the pipeline system is pressurized.

Figure 6:
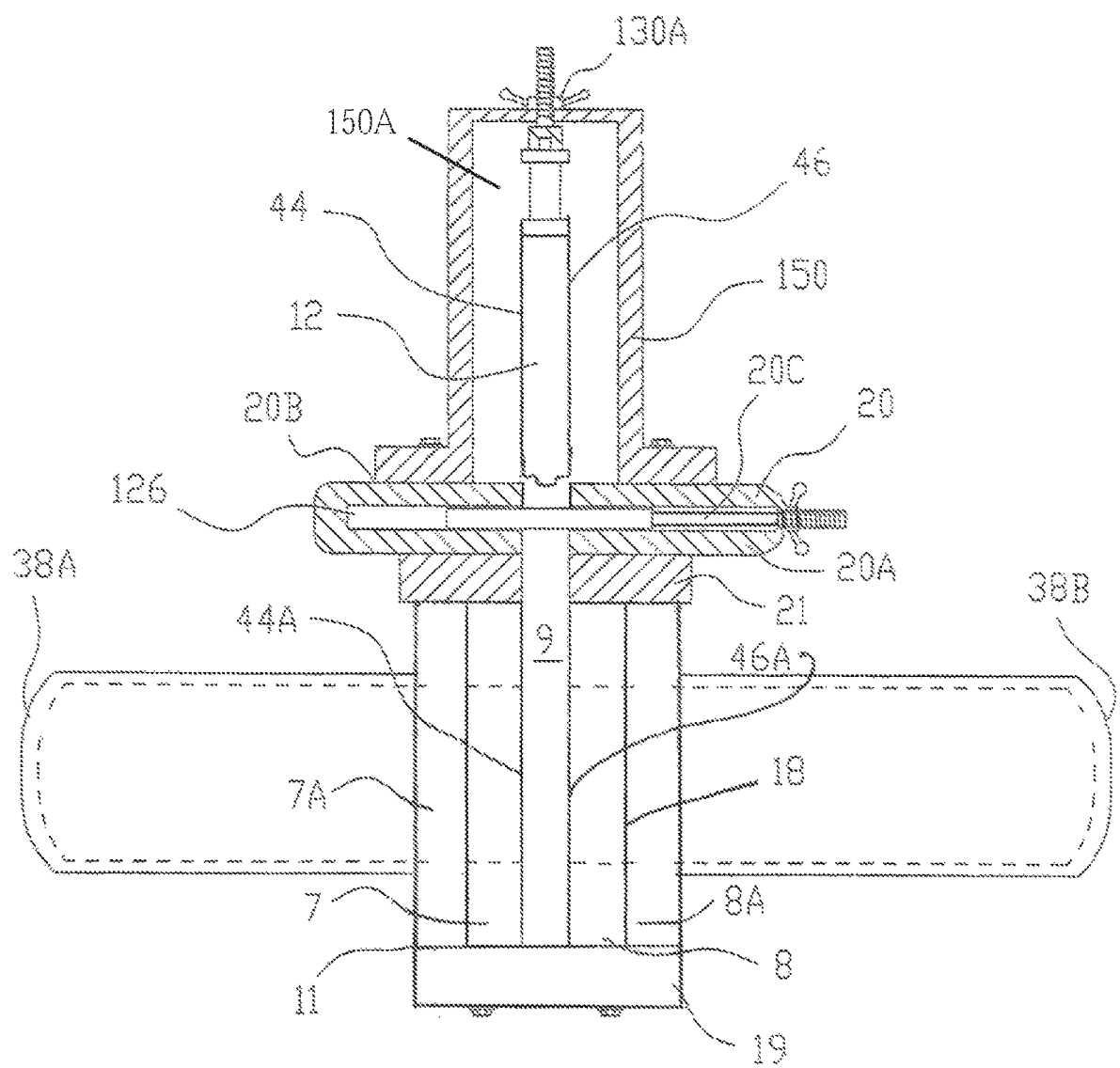

FIG. 6 is a side sectional view of the pipeline control unit of FIG. 3 showing the gate retracted completely into the attached chamber, with the isolation valve now in the closed position to allow depressurization of the attached chamber so that the gate can be removed along with the attached chamber.

Figure 7:
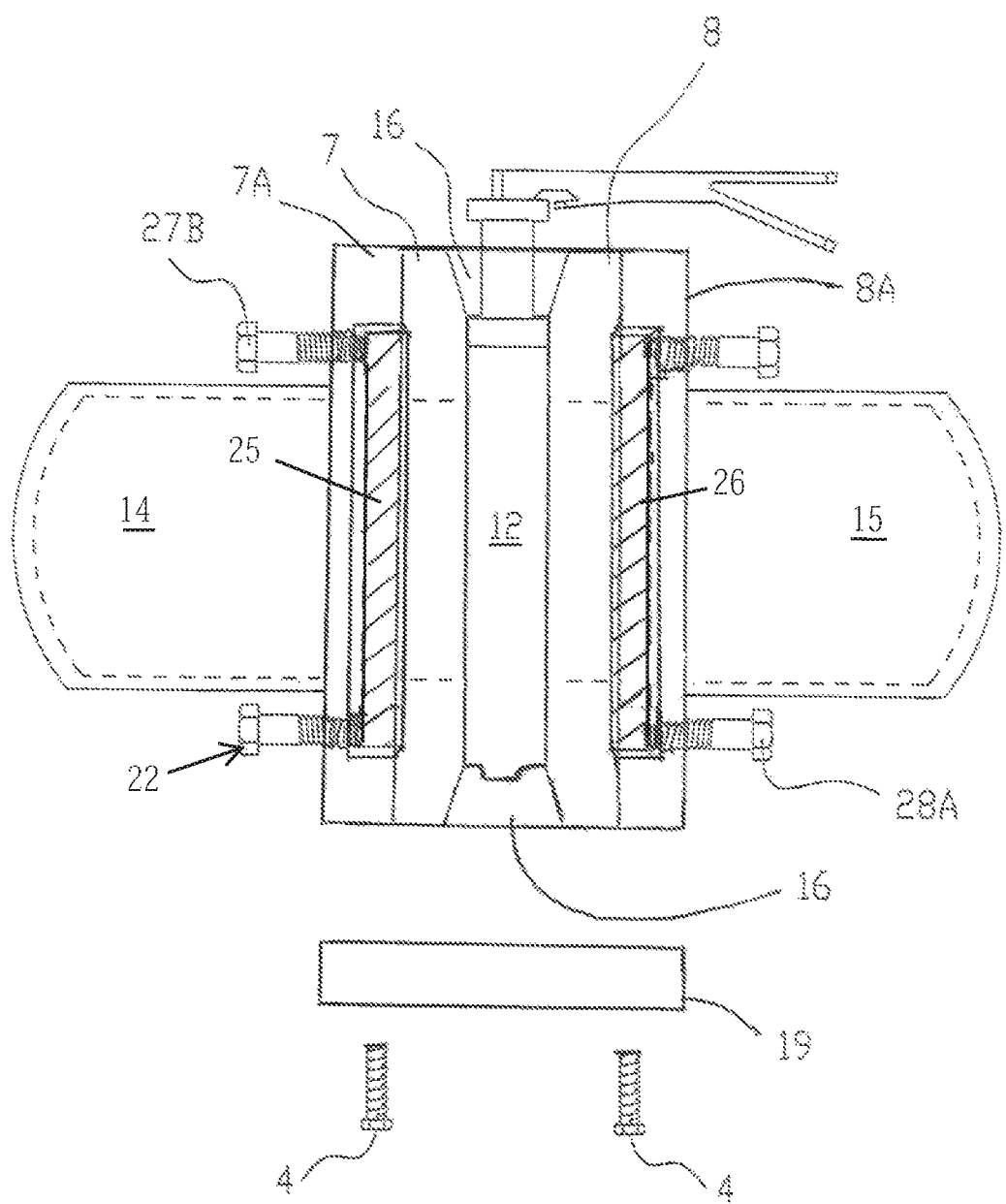

FIG. 7 is a side sectional view of the pipeline control unit of FIG. 3, showing the gate as a butterfly valve reinserted into the housing by reversing the procedures depicted above and shown providing two traveling members (25, 26) securing the gate into place in fluid tight engagement with the housing, allowing the removal of added components from the housing.

Figure 8:
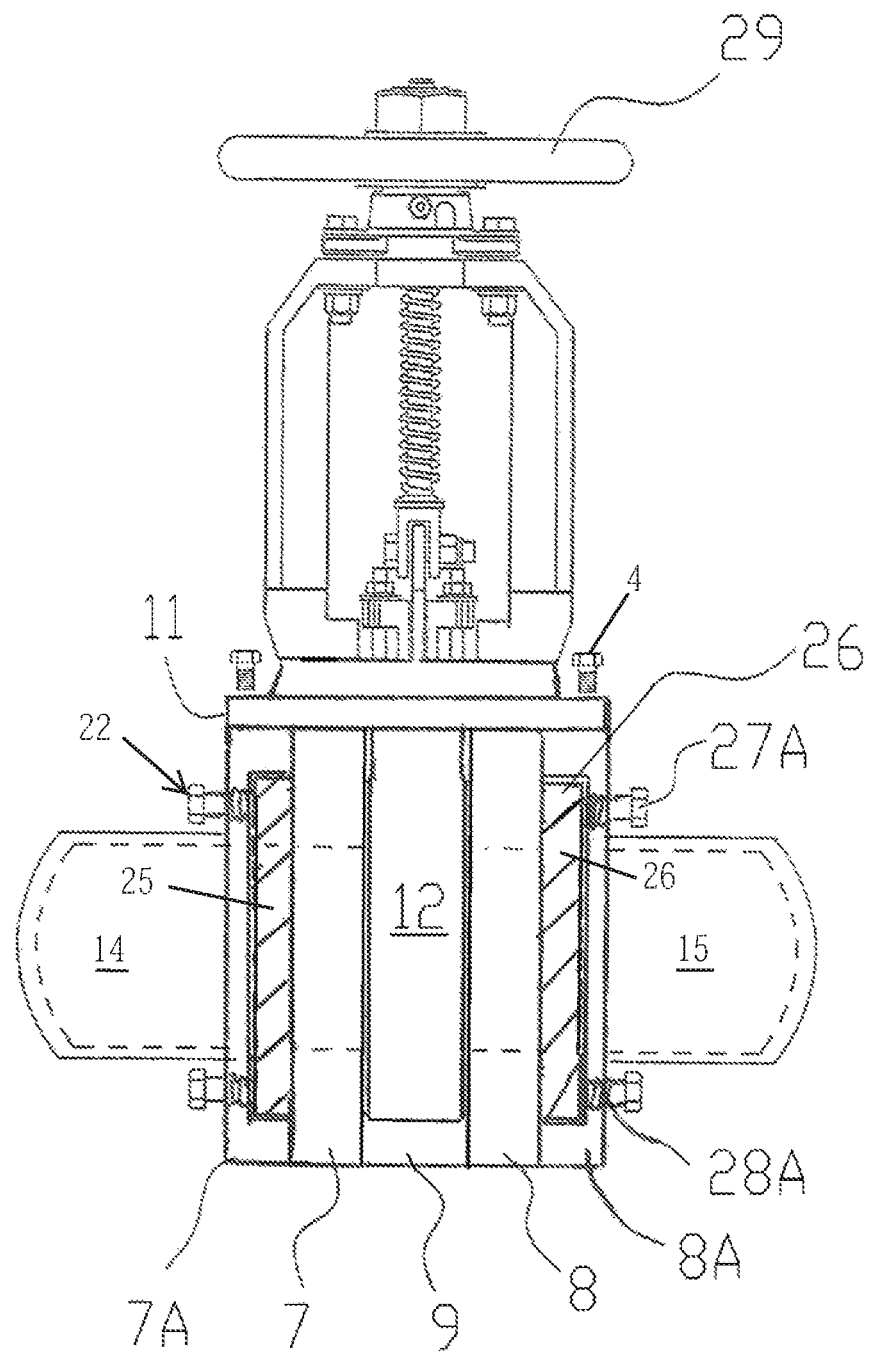

FIG. 8 is a side sectional view of the pipeline control unit of FIG. 3, showing the gate as a gate valve released from the housing by removing tension from the flexible wall, allowing removal of the gate without restriction.

Figure 9:
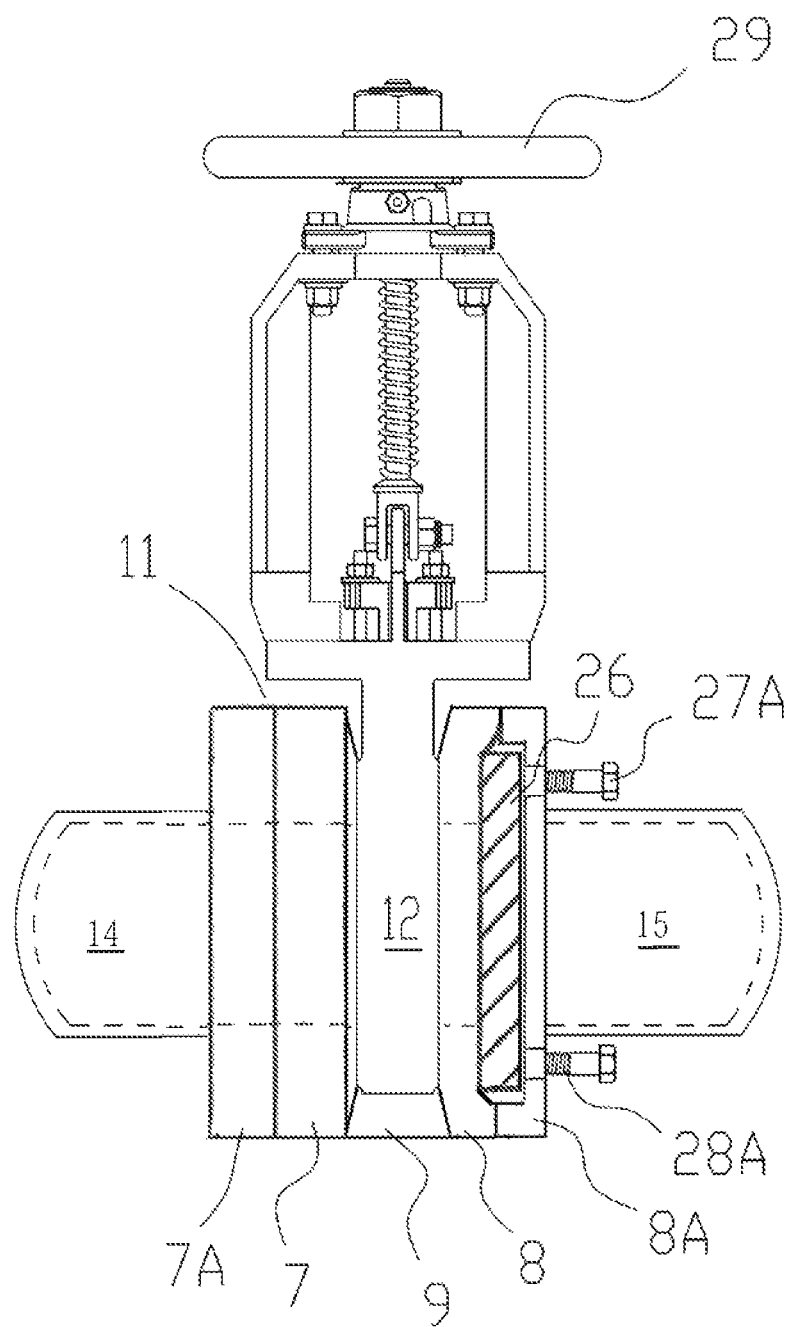

FIG. 9 is a side sectional view of the pipeline control unit of FIG. 3, showing the gate as a gate valve with tension being applied by one traveling member creating tension on a flexible wall to restrain and seal the gate in fluid tight engagement with the housing.

Figure 10:
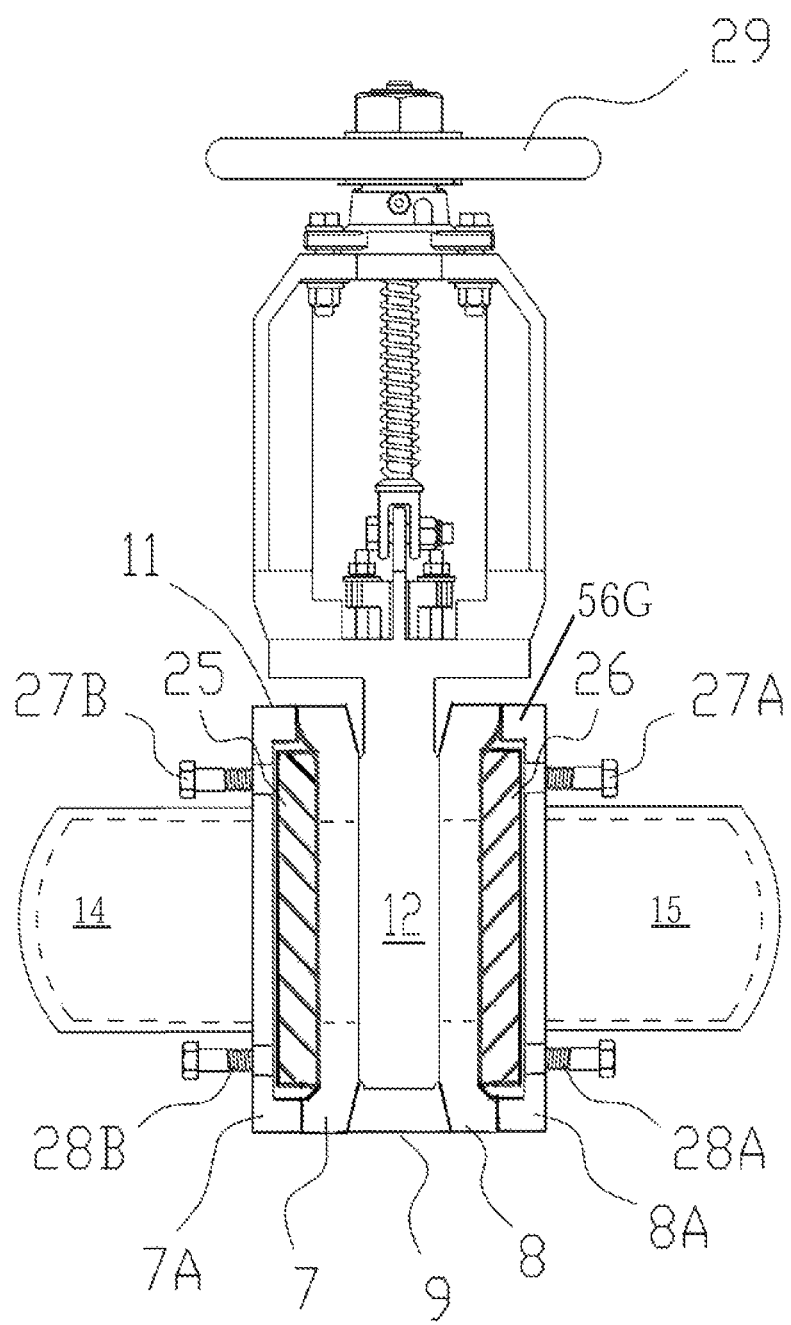

FIG. 10 is a side sectional view of the pipeline control unit of FIG. 3, showing the gate as a gate valve with tension being applied by two traveling members to create tension on both flexible walls, enabling restraint and sealing of the gate in fluid tight engagement with the housing.

Figure 11:
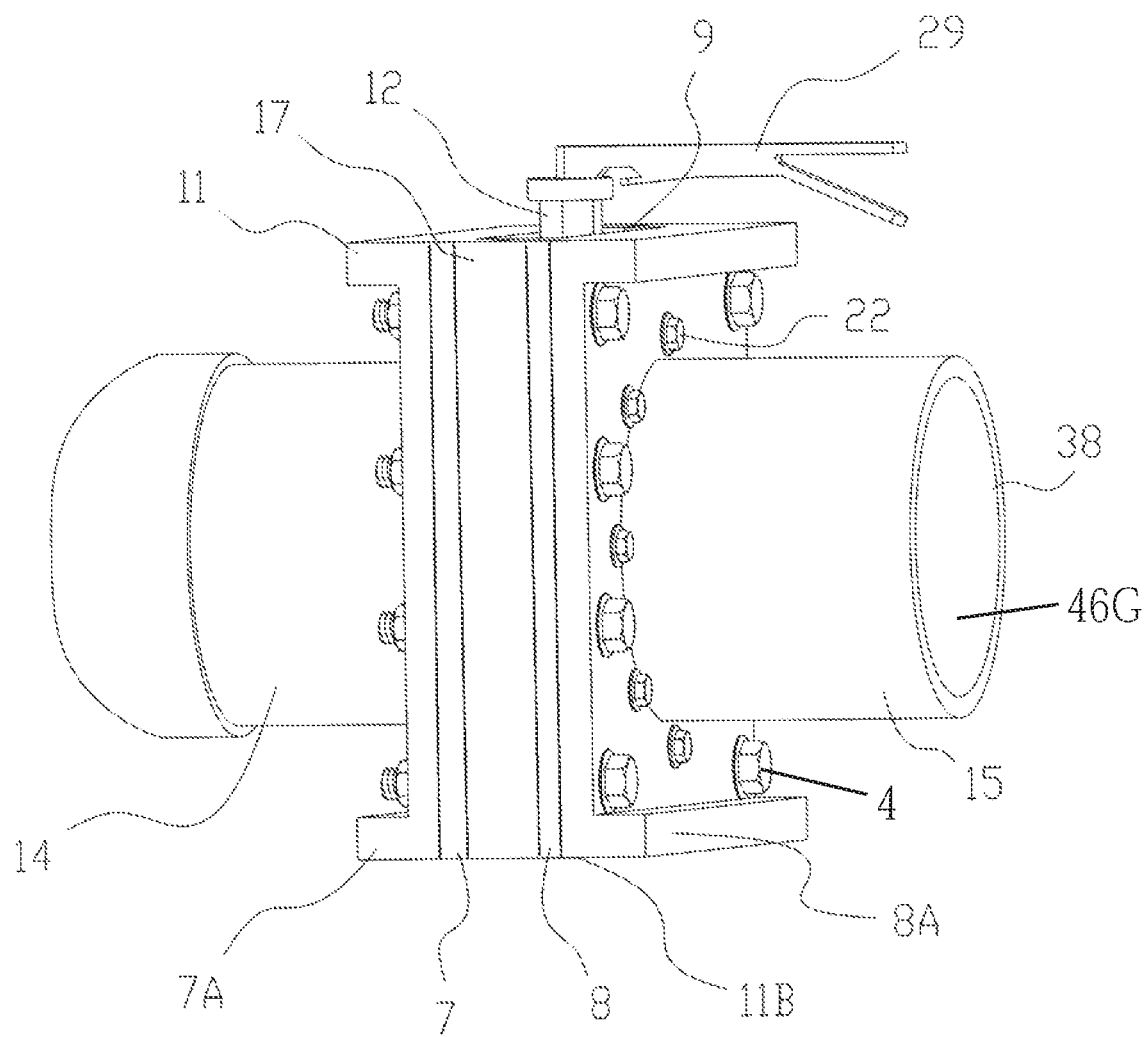

FIG. 11 is a perspective view of a control unit and housing, with the gate shown as a butterfly valve.

Figure 12:
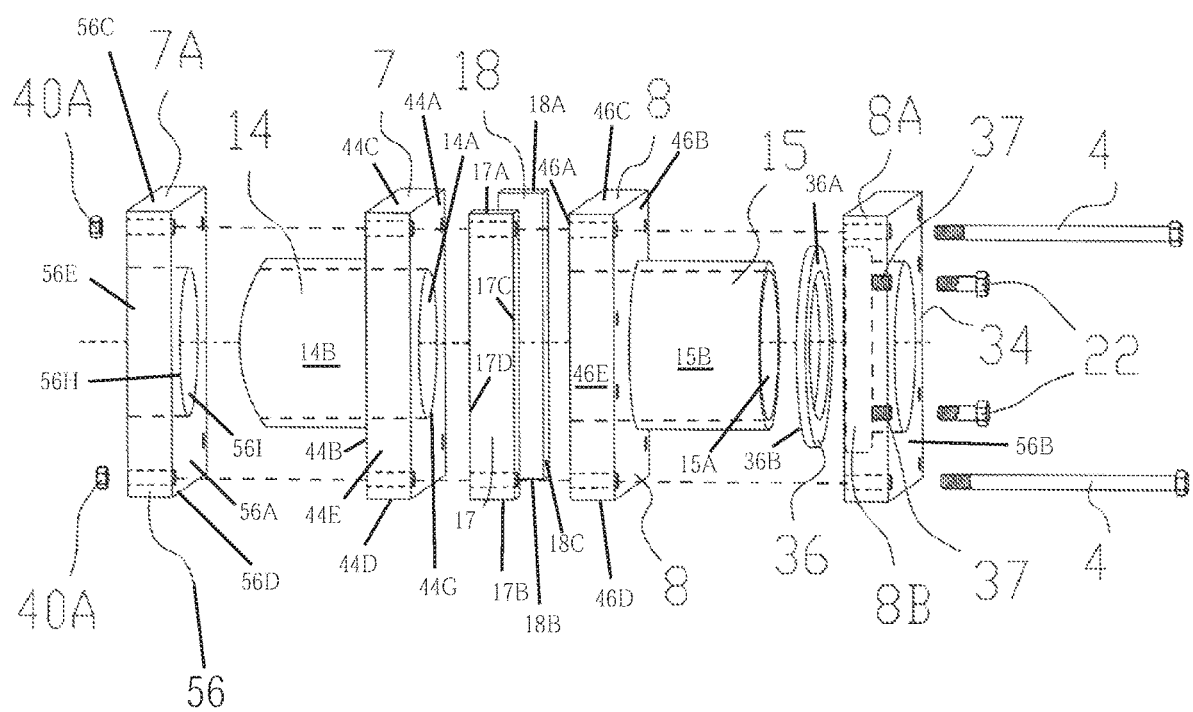

FIG. 12 is an exploded perspective view of the housing without the pipeline control mechanism. One traveling member is shown that can create tension on a flexible wall to restrain and seal the gate in fluid tight engagement with the housing. Body assembly bolts 4 and nuts 40A are used in the assembly of the housing.

Figure 13:
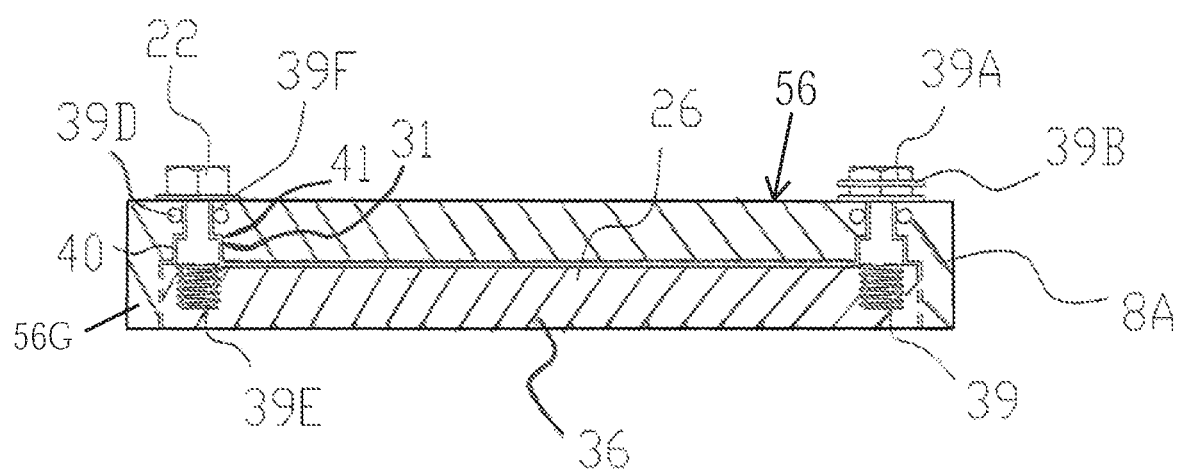

FIG. 13 is a sectional view which presents an alternative means of advancing, retracting and securing the traveling member from its position within the strongback 8A. This means provides threads in the traveling member instead of the strongback being threaded, allowing seals to be installed in the strongback to keep the threaded assembly clean, and provides ease in controlling even screw torque when applied to the ring.

Figure 14:
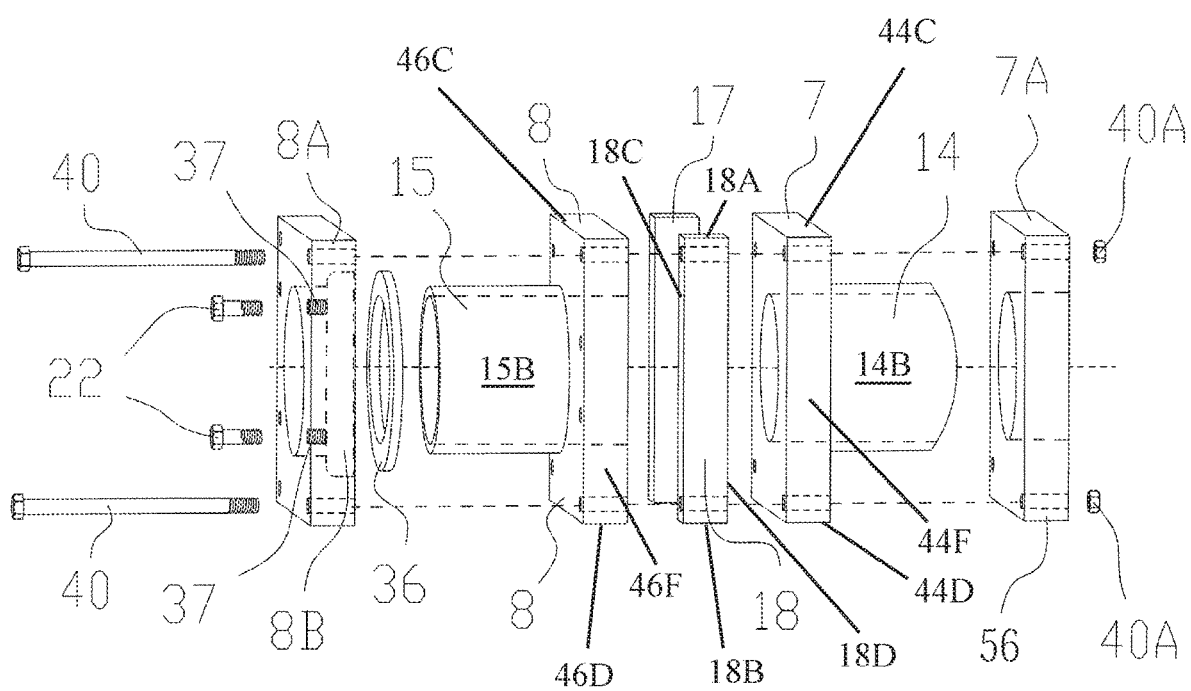

FIG. 14 is an exploded perspective view of the housing without the pipeline control mechanism shown from the side opposite the side shown in FIG. 12.

The reference numbers in the figures have the following meanings:

| Component | Subcomponent | Reference Number |
|---|---|---|
| pipeline control unit | | 10 |
| housing | | 11 |
| | interior compartment | 9 |
| | upper surface | 11A |
| | lower surface | 11B |
| left side internal wall | | 7 |
| | inner face | 44A |
| | outer face | 44B |
| | top | 44C |
| | bottom | 44D |
| | front side | 44E |
| | rear side | 44F |
| | opening in the inner face | 44G |
| left side conduit | | 14 |
| | interior surface | 14A |
| | exterior surface | 14B |
| | distal end | 38A |
| right side internal wall | | 8 |
| | inner face | 46A |
| | outer face | 46B |
| | top | 46C |
| | bottom | 46D |
| | front side | 46E |
| | rear side | 46F |
| | opening in the inner face | (not shown) |
| right side conduit | | 15 |
| | interior surface | 15A |

-continued

| Component | Subcomponent | Reference Number |
|---|---|---|
| | exterior surface | 15B |
| | distal end | 38B |
| front side wall | | 17 |
| | top | 17A |
| | bottom | 17B |
| | right side | 17C |
| | left side | 17D |
| rear side wall | | 18 |
| | top | 18A |
| | bottom | 18B |
| | right side | 18C |
| | left side | 18D |
| strongback | | 56 |
| | inner face | 56A |
| | outer face | 56B |
| | top | 56C |
| | bottom | 56D |
| | front side | 56E |
| | rear side | (not shown) |
| | peripheral portion of the inner face | 56G |
| | central aperture | 56H |
| | aperture interior surface | 56I |
| | receptacle | 40 |
| | receiving surface | 41 |
| left side strongback | | 7A |
| right side strongback | | 8A |
| traveling member | | 36 |
| | outer face | 36A |
| | inner face | 36B |
| left side traveling member | | 25 |
| right side traveling member | | 26 |
| pressure rod (screw) | | 22 |
| | shoulder | 31 |
| | attached nut | 39A |
| | pin | 39B |
| | threads | 39E |
| | opening | 39F |
| | second screw | 39 |
| | O-rings or seals | 39D |
| bolt | | 4 |
| gate | | 12 |
| | first face (left side face) | 44 |
| | second face (right side face) | 46 |
| conduit axis | | 13 |
| pressure cover plate | | 19 |
| isolation valve assembly | | 20 |
| adapter plate | | 21 |
| right side pipeline portion | | 23 |
| left side pipeline portion | | 24 |
| flap plate | | 76 |
| self-operating pipeline control unit | | 76A |
| advancing mechanism | | 129 |
| nut | | 130A |
| valve-servicing assembly | | 140 |
| attached chamber | | 150 |
| pressurized chamber | | 150A |

DETAILED DESCRIPTION

Definitions

As used herein, the following terms and variations thereof have the meanings given below, unless a different meaning is clearly intended by the context in which such term is used.

"Below," "downward," "downwardly," "lower," and "under" mean in the direction of or toward the ground or other support surface on which the present valve is supported, in most cases. "Above," "upward," "upwardly," "upper," and "over" mean in the opposite direction, usually away from the ground or other support surface.

"Compartment" refers to a partially or fully enclosed space within a device or component, such as within the housing to accept a gate.

"Connection" as used herein includes an indirect connection via one or more intermediate fittings or other components (e.g. a size adapter fitting).

A "connector" or "connection-facilitating means" refers to a mechanism or portion of a mechanism used to mechanically join two or more components of the present device. Connectors can take any of various forms including a flange, threaded receptacle (such as for a screw), fusing, welding, groove locking mechanism, a machine screw connector, and any of many other known locking means.

"Fluid tight," in regard to a connection or barrier between components of the present device, refers to a connection or barrier which does not allow fluid to pass across the connection or barrier when the fluid is at a pressure within predetermined operating limits of the fluid tight connection or barrier.

"Flexible," when referring to a material or component such as the internal walls (7 and 8), means a material or component which can be bent or compressed by the screws or other pressure rods used in the present unit. Preferably, flexible materials which are compressible have sufficient elasticity to resume their shape after being compressed by the pressure rods.

"Gate" refers to a component or device that can be retained in the housing of the present pipeline control unit which controls, affects the flow of a fluid through the present valve. Examples of gates include those that can stop fluid flow, pass flow, reduce fluid flow, such as one or more of the following: a gate valve, metal gate, rubber coated gate, a directional-flow mechanism (e.g., a check valve), a butterfly valve, plug, ball valve, a through-flow cartridge retained in a gate such as an orifice plate, and/or a safety screen to screen particles.

"Gate advancing mechanism" refers to a component that advances or withdraws a gate in the present pipeline control unit. Commonly known gearing and attachments can be used.

"Gate valve" refers to a valve with a sliding part that controls the extent of the aperture.

"Pipeline" as used herein includes any type, size, and composition of fluid-carrying conduit.

"Outwardly" refers to a direction away from a central portion of the present pipeline control unit, such as a direction away from the interior compartment for holding a gate in the pipeline control unit.

"Plate" refers to a sheet or piece of rigid material (such as metal) that forms a distinct section or component of the present device, usually having a height and length greater than its thickness.

"Rigid," when referring to a material or component such as the strongbacks (7A and 8A), means a material or component which cannot be bent or compressed by the screws or other pressure rods used in the present unit, and which preferably is not elastically deformable.

References to a "screw" for moving a traveling member refer to a threaded rod, and this term is not intended to exclude other similar mechanical components such as a bolt. Other means for accomplishing the application of pressure to the traveling members are also contemplated through other pressure rods. Various known bearings or rotational surfaces can be attached at the end of the screws to avoid galling if desired. Screws can also refer to threaded members of various shapes with smooth, non-threaded areas of the screw, including various diameters and lengths.

A "strongback" refers to a rigid structure that can be adjacent to pliable or softer materials and is used to support these softer materials when fluid pressure is applied. Attached activation accesses are included for mechanical means such as screws or gear drives. Many mechanical means can be incorporated into the strongback that allow actuation of the traveling members to move pliable walls of a valve housing to create or remove tension between adjacent or touching traveling members. Areas within the strongback such as openings or voids can be provided to retain the traveling member.

"Traveling member" refers to a plate, ring, or other member which can be moved by mechanical means and abuts the outer face (surface) of a wall of the housing of the present pipeline control structure. A traveling member also surrounds (completely or incompletely) the exterior diameter of a conduit extending from the housing. Traveling members are preferably made from a flexible material, and at least the face of the traveling member which faces a housing wall is preferably flat/planar in order to make contact with the housing wall. Traveling members can have a circular inner and/or outer periphery (in the manner of a gasket) in order to fit over the outer periphery of a cylindrical conduit extending from the housing, but a differently shaped inner periphery and/or outer periphery is also possible.

A "valve" is a device that regulates the flow of a fluid (typically a liquid, but also including a gas) by opening, closing, or partially obstructing a passageway.

Terms of relative position such as "upper," "lower," "top", "bottom," "proximal," "distal," "right," "left," "inwardly," "outwardly," and similar terms are used to designate areas and positions of portions or components of the present device with respect to other portions or components of the present device, but it is to be understood that these terms are relative and are not absolute terms.

As used herein, the term "comprise" and variations of the term, such as "comprising" and "comprises," are not intended to exclude other additives, components, integers or steps. The terms "a," "an," and "the" and similar referents used herein are to be construed to cover both the singular and the plural unless their usage in context indicates otherwise.

Pipeline Control System

The present invention comprises a pipeline control unit 10 which includes a housing 11 having an interior compartment 9. The housing generally includes a left side internal wall 7, a right side internal wall 8, a front side wall 17, and a rear side wall 18. The left side internal wall 7 has an inner face 44A, an outer face 44B, a top 44C, a bottom 44D, a front side 44E, and a rear side 44F and further includes a conduit 14 having an interior surface 14A and exterior surface 14B. The conduit 14 extends outwardly from the outer face 44B of the left inner side wall 7 and communicates with the interior compartment 9 of the housing 11 through an opening 44G in the inner face 44A of the left side internal wall 7. The left inner side wall 7 can be integrally formed with the left side conduit 14 in a preferred embodiment.

The right side internal wall 8 likewise has an inner face 46A, an outer face 46B, a top 46C, a bottom 46D, a front side 46E, and a rear side 46F and further includes a conduit 15 having an interior surface 15A and exterior surface 15B. The conduit 15 extends outwardly from the outer face 46B of the right side internal wall 8 and communicates with the interior compartment 9 of the housing through an opening 46G in the inner face 46A of the right side internal wall 8. The conduits (14, 15) are preferably oriented along the same longitudinal axis 13, though this is not required. The right side internal wall 8 can be integrally formed with the right side conduit 15 in a preferred embodiment.

The housing 11 of the present pipeline control unit 10 further includes a front side wall 17 and a rear side wall 18. The front side wall 17 has a top 17A, a bottom 17B, a right side 17C and a left side 17D, while the rear side wall 18 likewise has a top 18A, a bottom 18B, a right side 18C and a left side 18D. The left side 17D of the front side wall 17 is connected to the left side internal wall 7 and the right side 17C of the front side wall 17 is connected to the right side internal wall 8. The front side wall 17 can be integrally formed with either or both of the left side internal wall 7 or the right side internal wall 8. The rear side wall 18 is connected on the left side 18D to the left side internal wall 7 and the right side 18C of the rear side wall 18 is connected to the right side internal wall 8. The rear side wall 18 can similarly be integrally formed with the left side internal wall 7 or the right side internal wall 8.

The present pipeline control unit 10 further comprises strongbacks 56. A left side strongback 7A can have an inner face 56A, an outer face 56B, a top 56C, a bottom 56D, a front side 56E, and a rear side 56F, with the inner face 56A of the left side strongback 7A facing the outer face 44B of the left side internal wall 7. A peripheral portion 56G of the inner face 56A of the left side strongback 7A is in contact with the outer face 44B of the left side internal wall 7. The left side strongback 7A further includes a central aperture 56H extending between the inner face 56A and the outer face 56B, with the aperture 56H having an interior surface 56I which extends around the exterior surface 14B of the left side conduit 14. A receptacle 40 in the inner face 56A of the left side strongback 7A between the central aperture 56H and the peripheral portion 56G of the inner face 56A retains a first (left side) traveling member 25 in the receptacle 40 of the left side strongback 7A, the traveling member 36 having an outer face 36A and an inner face 36B. The traveling member 36, like the strongbacks 56, is positioned around the respective conduit (left side conduit 14 in the case of left side traveling member 25). While a circular traveling member 36 and receptacle 40 is illustrated for example in FIG. 12, other shapes are also possible, as are traveling members 36 which do not completely encircle their respective conduits.

Pressure rods 22, which are preferably screws, extend from the outer face 56B of left side strongback 7A to the outer face 36A of the first (left side) travelling member 25. The pressure rods 22 are capable of exerting pressure against the outer face 36A of the first travelling member 25 and thereby place pressure against the outer face 44B of the left side internal wall 7. In this way, the left side internal wall 7 is urged inwardly (toward the interior 9 of the housing 11). When a gate 12 is retained in the interior 9 of the housing 11, the pressure exerted by the pressure rods 22 will urge the inner face 44A of left side internal wall 7 against the left side face 44 of the gate 12 and thereby create a friction fit, and preferably also a fluid tight seal, between the inner face 44A of left side internal wall 7 against the left side face 44 of the gate 12. Preferably, the pressure rods 22 are distributed around the traveling member 36 in an evenly-spaced manner, i.e. such that the pressure rods 22 are distant from each other by approximately the same distance, though this is not required, as shown for example in FIGS. 11 and 12.

The pipeline control unit 10 also includes a right side strongback 8A having an inner face 56A, an outer face 56B, a top 56C, a bottom 56D, a front side 56E, and a rear side 56F, with the inner face 56A of the right side strongback 8A facing the outer face 46B of the right side internal wall 8. A peripheral portion 56G of the inner face 56A of the right side strongback 8A is in contact with the outer face 46B of the right side internal wall 8, and the right side strongback 8A further comprises a central aperture 56H extending between the inner face 56A and the outer face 56B, the aperture 56H having an interior surface 56I which extends around the exterior surface 15B of the right side conduit 15. In a preferred embodiment, traveling members 36 are used on both the right and left internal walls (8, 7) of the present pipeline control unit 10, so that the right side strongback 8A also retains a traveling member 36. In this embodiment, the right side strongback 8A comprises a receptacle 40 in the inner face 56A between the central aperture 56H and the peripheral portion 56G of the inner face 56A, and a second (right side) traveling member 26 is placed in the receptacle 40 of the right side strongback 8A. The second traveling member 26 has an outer face 36A and an inner face 36B, and pressure rods 22 extending from the outer face 56B of right side strongback 8A to the outer face 36A of the second travelling member 26 can be urged against the outer face 36A of the second travelling member 26 in order to exert pressure against the outer face 36A of the second travelling member 26 and thereby place pressure against the outer face 46B of the right side internal wall 8 to retain a gate 12 placed in the interior compartment 9 of the pipeline control unit 10.

The gate 12 used in the present pipeline control unit 10 can be any of a number of different flow control mechanisms. For example, the gate 12 can be a gate valve, a metal gate, a rubber coated gate, a check valve, a butterfly valve, a plug, a ball valve, an orifice plate, or a safety screen. The left side internal wall 7 and right side internal wall 8 are preferably formed from a flexible material such as polytetrafluoroethylene (PTFE), high-density polyethylene (HDPE), fiberglass, composite or polyvinyl chloride (PVC), while the strongbacks 56 are preferably formed from a rigid material such as carbon steel, stainless steel, or brass.

The pipeline control unit 10 can include an upper access opening, such as adapter plate 21, attached to the top of each of the rear side wall, front side wall, left side internal wall, and right side internal wall (18A, 17A, 44C, and 46C respectively) of the housing 11. Preferably, the upper access opening is reversibly secured to the housing 11 and can form a fluid tight seal with the upper portion of the housing 11. In some embodiments, the pipeline control unit 10 can include a lower access opening (pressure cover plate 19) attached to the bottom of each of the rear side wall, front side wall, left side internal wall, and right side internal wall (18B, 17B, 44D, and 46D respectively) of the housing 11. The lower access opening 19 forms a fluid tight seal and is preferably reversibly secured to the housing 11.

Figure 1:
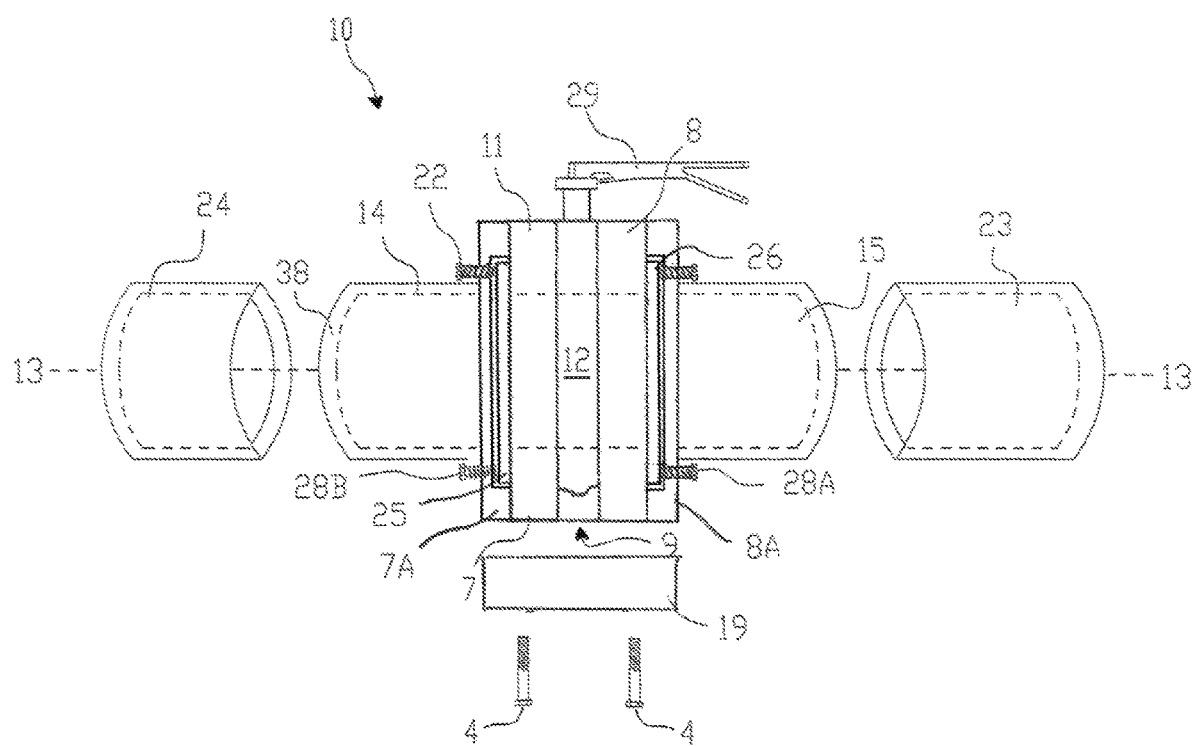

FIG. 1 of the drawings shows various aspects of a pipeline control unit 10 constructed according to the present invention. Generally, the pipeline control unit 10 includes subassemblies referred to in this description as a housing 11 and a gate 12, pressure cover plate 19 and valve-servicing assembly 140 with isolation valve assembly (shown, e.g., in FIGS. 3-5). Gates 12 come readily available and perform various pipeline functions and operations that will be explained in more detail below.

The flexible internal walls (7 and 8) and side members (17 and 18) of the housing 11 are preferably constructed as a one-piece structure, but multiple-piece structures are described herein. The housing 11 preferably extends along a conduit axis 13 between first and second sides with conduit ends 14 and 15 as part of housing 11. The housing 11 also further defines a hollow interior compartment 9. Flexible internal walls 7 and 8, depicted for example in FIGS. 1 and 12, are preferably coupled to the two opposing conduit ends, respectively, and to side members 17 and 18, which may be rigid. The flexible internal walls (7 and 8) can be square in form, although tapered walls can also be used. The flexible internal walls 7 and 8 and conduit ends 14 and 15 of the housing 11 are preferably in fluid tight communication, such as by being integrally molded, so that if pressure cover plate 19 and isolation valve assembly 20 (FIG. 4) are assembled onto the housing 11 and form a completed service-assembly 140, the housing 11 can be transformed into a pressurized unit as desired. Adapter plate 21 (FIGS. 4 and 5) can be used as an intermediate connector between housing 11 and isolation valve assembly 20. Strongbacks 7A and 8A in (FIGS. 8, 9, and 10) are used to withstand fluid pressure when applied against the flexible internal walls 7 and 8. Strongbacks 7A and 8A also aid in retaining the traveling members 25 and 26 in position. When screws 22 (such as screws 27A, 27B, 28A, and 28B) are rotated in the advanced direction (i.e., toward a traveling member 36), the traveling member 36 compresses the flexible walls 7 and 8 presses their internal faces against a gate 12. When rotated in a reverse direction, the compression exerted by the screws 22 is released.

Strongbacks 7A and 8A may be composed of steel, ductile iron, composite material, plastics or other suitable rigid composition. The flexible internal walls 7 and 8 can be formed as a single piece with opposing conduit ends 14 and 15, e.g. through molding or by being assembled from fluid tight fitted or fused sections or segments. These components can incorporate a combination of various materials to facilitate sealing including plastics (such as polyethylene), composites, rubber, some metals, and other known flexible materials and products. The two opposing sides 14 and 15 preferably are plain end and used for fusing, welding, or slip-on connections, or are flanged for bolting, but many attachable configurations can be used, including threaded or grooved configurations.

As seen in FIG. 8, the traveling member 26 functions to release compression to flexible internal wall 7 so the control unit 12 can be removed without restriction by loosening the mechanical means, shown on the right side of the housing 11 as screws 27A and 28A. Although only two screws 22 are shown in FIG. 8, it is to be understood that additional screws 22 positioned around the circumference of the traveling member 25 will generally be used, as shown in FIG. 11.

FIG. 9 depicts the advancement of one traveling member 36 by screws 27A and 28A. This advancement causes inward movement of a central portion of flexible internal wall 8, thereby reducing the width of the interior of compartment 9. This results in the flexible internal wall 8 holding or vertically restraining the gate 12 in fluid tight engagement. Although only one traveling member 36 is shown in FIG. 9 (as well as in FIG. 12), traveling members 36 can be used on both sides of the present pipeline control unit 10 (as shown in FIGS. 1, 7, 8, and 10).

FIG. 10 depicts both traveling members 25 and 26 being advanced by screws 27B and 28B, and by screws 27A and 28A, respectively. This advancement causes inward movement of both flexible internal walls 7 and 8, reducing the width of the interior of compartment 9 so as to hold or vertically restrain the gate 12 in fluid tight engagement with the interior walls of the housing 11. Traveling members 25 and 26 are positioned within the strongbacks 7A and 8A and surround the exterior of conduit 14 and or 15 outside of flexible internal walls 7 and 8. When the traveling members 25 and 26 are advanced by mechanical means (such as by screws 27 and 28) in the strongbacks 7A and 8A, they apply pressure to the external sides of flexible internal walls 7 or 8 and create compression that holds and seals control unit 12 within interior compartment 9.

FIG. 13 depicts another embodiment of the screws 22, strongback (7A, 8A) and traveling member 36. This embodiment shows one traveling member, but the method can be applied for both traveling members 36. The traveling member 26 shown in FIG. 13 provides threads 39E accepting screws 22. When rotated, the screws 22 advance the traveling member 26, and when screws 22 are rotated in reverse the traveling member 26 is retracted. In this embodiment, a portion of the screws 22 having a reduced diameter pass through the strongback 8A, and a shoulder 31 is provided in a distal portion of the screw 22 which has a wider diameter. The shoulder 31 contacts a receiving surface 41 in a receptacle 40 of the strongback 8A. The shoulder 31 restricts the inward and outward movement of the screw so only the traveling member 26 travels in and out of position. The screw 39 has an attached nut 39A that is pinned or secured by a pin 39B to force the traveling member to move in and out without allowing the screw 22 to advance or retract. When rotating the screw assembly in the advancing direction, the traveling member 26 moves the lateral wall of strongback 8A toward the interior compartment 9, reducing the width of compartment 9. When rotating the screw assembly in the retracting direction, the traveling member 26 is pulled away from the lateral wall of strongback 8A and away from the interior compartment 9. The screw 22 is preferably smooth where it passes through the opening 39F in the strongback 8A so that O-rings or seals 39D can be included to keep debris from entering the mechanics of this assembly.

As seen in FIG. 1 the pipeline control unit 10 can be assembled with pipeline sections (conduits) 23 and 24 during construction or can be installed as a new side connection on pressurized pipelines by a technique known as hot tapping. As shown in FIGS. 3 and 4, a pipeline conduit 24 is connected and attached to the conduit 14 of the housing 11, and a pipeline conduit 23 is connected and attached to the conduit 15 of the housing 11. This places ends 38A and 38B on opposing sides of the housing 11 in fluid communication with the corresponding openings of each of the pipeline conduits. The first and second ends 38A and 38B of the housing 11 can be fused, threaded, flanged, grooved, welded or otherwise configured so that a user can readily connect each end to a respective one of separate first and second pipeline sections, either directly or via intermediate fittings.

The illustrated pipeline can, for example, can be a 6-inch (15.2 cm) pipeline which might typically have an outside diameter (O.D.) measuring about 6.5 inches (16.5 cm) to 7.75 inches (19.7 cm), but the present pipeline control unit works on any of various sized pipelines with 1 inch (2.5 cm) diameter up to 114-inch (366 cm) or larger diameter. A housing 11 constructed according to the invention is sized according to the pipe O.D. with which it will be used. Each of the first and second pipeline conduits 23 and 24 can be connected to the respective first and second conduit ends 38A and 38B of the pipeline control unit 10 in a fluid tight manner.

The housing 11 includes a through body interior compartment 9 that defines a hollow body interior and access openings 16 (seen in FIG. 7). The interior compartment 9 extends between first and second openings 38A and 38B in the first and second conduits 14 and 15 of the housing 11, and is sized to accommodate the gate 12.

As seen in FIG. 6, the interior compartment 9 of the housing 11 comprises a first interior face 44A in communication with a first opening 38 of the housing and in such embodiments, the gate 12 thereto can likewise comprise a first face 44 for engaging the first interior face 44A of the interior compartment in a fluid tight manner and a second face 46 for engaging the second interior face 46A of the interior compartment 9 in a fluid tight manner.

Preferably, the housing 11 includes means on the upper surface 11A and lower surface 11B (adjacent the access openings 16 of the housing 11), as seen in FIG. 3, for facilitating the fluid tight connection of a pressure cover plate 19 and the service assembly 140. The gate 12 is removably mounted within the access opening 16, where it functions as a means for enabling a user to selectively stop and unstop fluid communication, for example, or to perform other control functions between the first and second ends 38A and 38B of the pipeline control unit 10.

Figure 2A:
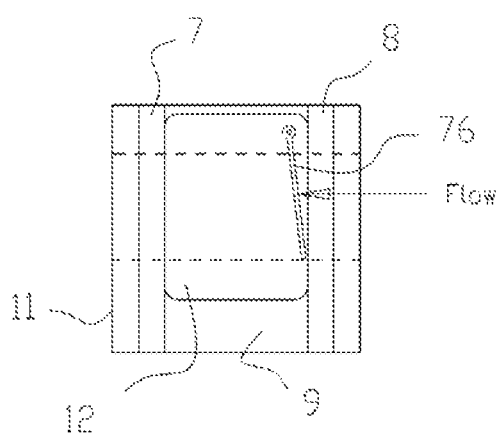
FIG. 2B is a side sectional view of a directional flow device or "check-valve" gate installed into the housing, as shown here to be in the open position due to correct flow direction and can be secured by the traveling member.
FIG. 2C is a perspective view of a safety-screen gate that can be installed in the present pipeline control unit temporarily or permanently to protect debris from passing through and injuring expensive devices found in some pipeline systems. This can be removed, replaced or reinstalled in relationship to the housing and secured by the traveling member.
Figure 2B:
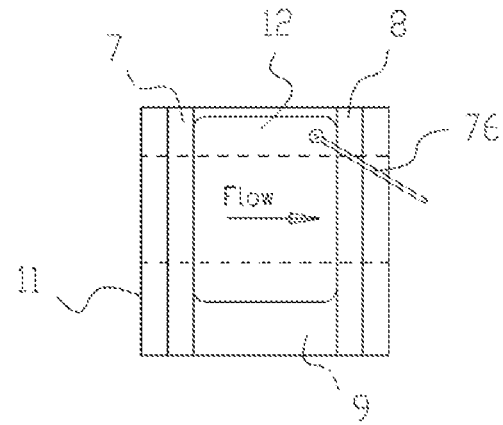
Figure 2C:
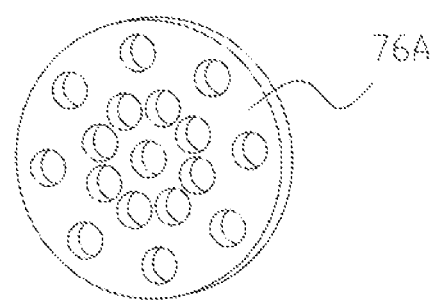

The gate 12 depicted in the present pipeline control unit can be, for example, a butterfly valve 12, a directional-flow device, a "check-valve" (FIG. 2A, 2B) or other self-operating device that does not require operator assistance, an orifice plate (plate with a single opening), a gate or plate, or a protection screen (FIG. 2C). The manually operated gate 12 depicted is an easily obtainable butterfly valve adapted to be installed into the housing 11 in fluid tight engagement through the use of a traveling member 36. In view of the design of the present pipeline control unit 10, many standard gates can be converted into an installable and removable cartridge for use with the present system.

The butterfly gate 12 depicted provides a hand operated actuator lever 29. The handle 29 as depicted in FIGS. 1, 7, and 11 is operated by hand where the operator can manually stop and unstop flow communication between pipeline conduits 23 and 24 by rotating the lever 29 which is directly connected to the valve stopping means. By selective positioning of the lever 29, various volumes of flow can be controlled through the gate 12 between the unstopped and stopped positions. Many known operators can take the place of the lever 29 including gear driven mechanisms, pneumatic mechanisms, hydraulic mechanisms, and electric mechanisms, to name a few.

One self-operated gate (shown in FIGS. 2A and 2B) is known as a directional-flow device or "check-valve" that uses an activated self-sealing one-way flap plate 76 that allows passage of fluid in only one direction. Another self-operating gate is known as an orifice plate or through-flow device. The use of this orifice plate allows passage of fluid through the housing 11 without relying on the housing 11 being pressurized during transfer of the fluid and protects the access opening 16 of the housing 11 from debris. Different diameter orifices can be provided that can alter pipeline flow velocity to restrict flow. One self-operating gate 76A (FIG. 2C) can provide a protective screen to protect pumps and other critical components in a pipeline system.

A variety of gates 12 used in the industry can be devised to work within the present housing 11. Most styles of "operator" and "non operator" gates 12 can be used. Traveling member 36 can apply compression and fluid tight engagement to many known gate seating surfaces without modification.

Gates 12 can be selectively attached to the advancing mechanism 129 (as depicted in FIGS. 3-6) and function as a means for enabling a user to advance the gate 12 between the installed and removed positions. The gate-advancing mechanism 129 advances and withdraws the gate 12 from its installed position within the housing 11 (FIGS. 4 and 5) to the removed position in the attached chamber 150 (FIG. 6) and selectively back to the installed position as desired (FIG. 7). The advancing mechanism 129 is operated, e.g., using a hand-wheel, wrench or suitable means, and on large sizes hydraulic, electric or pneumatic power can be incorporated. Hand operated advancing mechanism 129 (e.g., a rotatable threaded stem 129 and nut 130A combination) use is accomplished by using a user-operated, moveable component 129 that is part of the valve-servicing assembly 140 and selectively connected to the gate 12. The illustrated moveable component 129 is constructed according to known techniques to grip, turn, and withdraw the gate 12 under user control.

In one embodiment, the housing 11 includes connection means on the housing surfaces 11A and 11B for attaching a covering or pressure cover plate 19 over the access opening 16 onto the housing 11 in fluid tight connection. For example, a bolt 4 can be used to secure the cover plate 19 to the lower surface 11B (FIG. 3), which can be a mounting flange. These pressure cover plates 19 are only required if desired. Without the pressure cover plate 19 connected, the housing 11 with gate 12 installed functions as a controlling support housing without receiving pressure into access opening 16.

Method of Use

The present pipeline control unit addresses problems with currently known replaceable valves for pipelines by providing a gate that can be secured in place by compression of flange surfaces by external means. The assembled unit can selectively become a pressurized housing and returned back to being a non-pressurized housing.

A gate can be mounted and secured within the housing and configured to enable the user to selectively stop and unstop flow in a pipeline and perform various other pipeline controls when installed. The access opening in the housing is arranged to facilitate fluid tight, removable connection of separate isolation valve assemblies to enable a user to remove and replace the pipeline control unit through the isolation valve assembly.

A housing having such an access opening can be connected to an isolation valve assembly, after which a pressure housing cover plate is connected. The traveling member of the control unit can then be reversed to remove tension so the pipeline control unit can be withdrawn by use of an actuator from the housing through the isolation valve assembly into the pressure chamber. Reversing the order of these steps reinstalls the gate.

The housing can remain a housing that simply supports a gate for the life of the unit in hopes that no problem will arise necessitating repair or replacement of a gate. The access openings can include various means of attachment for pressure cover plates, isolation valve assemblies and servicing assemblies, but a flange-bolt pattern can be preferably used as one option to facilitate selective connection of these added components to the access openings of the valve body as required.

The housing can be manufactured to be used in 1"-144" pipelines, for example. The materials used in the present pipeline control unit can include all known materials useful with pipelines and combinations of such materials, such as carbon steel, stainless steel, brass, other metals, rubber and plastics. The housing and exit conduits can be sealed together by known fluid tight means. Preferably, a flexible material such as polyethylene (e.g., HDPE), or PVC can be used, though other plastics, composites and some metals are also options.

If a problem with a gate does arise, the present pipeline control unit with added components can become a fully pressurized unit allowing many service procedures to be performed, including testing of the gate, replacement of the original gate, repairing of the gate, and changing the type of gate, such as between a butterfly valve, wedge or gate valve, directional-flow mechanism, orifice plate, or other pipeline device. In addition, the size of the housing need not be any larger than what is required to securely retain the gate, which is held in place in fluid tight engagement by compression between the internal housing walls and the sealing surfaces of the gate activated by external means.

The present invention provides a housing that can selectively become a pressure-containing vessel and can facilitate hot tapping, removal, installation, switching and replacement of a gate without loss of pressure or pipeline product, and after service operations the added components can be selectively removed.

The isolation valve assembly and pressure cover plates of the invention are not required to allow the pipeline control unit to be a useful and operational member of a pressurized system. Thus, the optional added valve servicing assembly is only required if the above mentioned service procedures or hot tapping while a pipeline is pressurized is desired, thus greatly reducing the cost to the consumer and requiring less initial investment to design multiple sizes and manufacture them.

Many variations of gates that fit into the hollow interior of the housing and that can be compressed by traveling members to form a fluid tight engagement between the internal flexible walls and the gate can be used. This allows pressure cover plates and the valve-servicing assemblies to be removed without loss of system product. Various known materials can be employed to provide flexibility of the flexible internal walls for sealing, including rubbers, polytetrafluoroethylene (PTFE, such as Teflon), polyethylenes (such as HDPE), PVC, other plastics, composites, and some metals.

Once the pressure cover plate is removed, a unique feature of the present pipeline control unit is that the gate can be secured in place by a traveling member locking mechanism, in particular a restraining device operated externally that flexes the internal housing walls to engage with the gate sealing surfaces, compressing them in fluid tight engagement. Restraining the gate in place in fluid tight arrangement with the housing allows the valve servicing assembly to be removed safely without product loss or the risk of pipeline pressure blowing the gate out of engagement during service operations. This restraining process can allow removal of an attached isolation valve assembly and service chamber. It also accommodates a method of leaving a solid plate, an orifice plate or safety-screen in the housing of the present pipeline control unit for long durations if desired.

A flow-through opening structure or orifice plate, installed into the housing of the pipeline control unit, allows pipeline fluid to pass through the housing without being in contact with the internal compartment and its surfaces. The orifice plate can provide different diameters of flow openings to control or restrict passage of fluid or product.

Once a new gate is installed into the housing and the pressure cover plate and valve-servicing assemblies are removed the housing interior is returned back to a non-pressurized state. The housing is only full of fluid when desired or when the gate is not sealed with the housing.

The use of a valve-servicing assembly 140 that includes an isolation valve assembly 20, a chamber-defining structure or cover assembly 150 and an advancing mechanism 129 as illustrated in (FIGS. 3-6). FIG. 4 shows the housing 11 installed between the first and second pipeline sections 23 and 24. In servicing the gate 12 according to the invention, the valve-servicing assembly 140 is connected to the housing 11 over the access opening 16 to the mounting flange 11A (FIG. 3) that is done by bolting the isolation valve assembly 20 directly to an intermediate mounting flange 21 then to housing surface 11A (FIG. 4).

The isolation valve assembly 20 is placed in position over the access opening 16 relative to the valve (FIG. 4). The illustrated isolation valve assembly 20 is a slide gate valve that includes first and second ends 20A and 20B (identified in FIG. 3) and a gate 20C shown in FIG. 4 with the gate in the open position. However, any of various known types of valves can be used as an isolation valve as long as the gate 12 can pass through it. The gate 20C can be closed off after the gate 12 passes above it to seal off the upper access opening 16, and selectively opened to expose the upper access opening 16 as desired.

The attached chamber structure 150 includes an advancing mechanism 129 and is connected to the second end 20B of the isolation valve assembly 20 to form the valve-servicing assembly 140. The advancing mechanism 129 is advanced and securely fastened to the gate 12 and when assembled restrains the gate 12 to move it into various positions within the access opening 16.

The pressure cover plate 19 is installed to the mounting flange 11B (FIG. 4) over the lower access opening 16 to transform the housing 11 into a pressure containment and fluid tight structure. Once assembled, a traveling member 36 can be retracted back into the receiving area of a strongback 56, such as the area 8B within strongback 8A shown in FIG. 12, to release and un-restrain the gate 12 from housing 11 within the access opening 16.

The method continues by operating the advancing mechanism 129 to withdraw the gate 12 from the access opening 16 through the open isolation valve assembly 20 into a pressurized chamber 150A within the chamber-defining structure 150.

Withdrawing of the gate 12 into the chamber-defining structure 150 is depicted in FIGS. 4-6. This is accomplished using a user-operated, moveable component 129 that is part of the valve-servicing assembly 140. The illustrated advancing mechanism 129 is constructed according to known techniques to grip, turn, and withdraw the gate 12 under user control.

Next, the user closes the isolation valve assembly 20 by moving the gate 20C into receiving space 126 in order to place it in the closed position as depicted in FIG. 6. Doing so isolates the chamber 150A in the chamber-defining structure 150 from the upper access opening 16 in the housing 11. With the upper access opening 16 closed in that manner (i.e., isolated), the user can then place a repaired or replacement gate, such as the gate mechanism 12 in FIG. 6, into the chamber 150A within the chamber-defining structure 150 and connecting to the advancing mechanism 129, by securing the valve-servicing assembly 140 to the isolation valve assembly 20 and opening it. The gate 12 is advanced to the aligned position within the access opening 16 defined by the opening-defining portion of the valve body 11. Once installed, traveling members 36 can be advanced by rotating screws 22 (such as screws 28A and 28B in FIG. 1) into threads in the openings 37 (FIG. 12) in the strongback 7A and or 8A (as depicted in FIGS. 9 and 10) and/or by rotating screws 22 in threads in a traveling member 36 (see FIG. 13). This movement creates compression between access opening 16 of housing 11 and the gate 12 within housing 11 to achieve fluid tight and restraining engagement.

Once gate 12 is engaged and compressed with housing 11, the access opening 16 can be depressurized, the pressure cover plate 19 can be removed, and the valve-servicing assembly 140 removed and the access opening 16 allowed to dry.

To summarize the above-described methodology, the method is one for repairing under pressure a gate or "cartridge" by providing the gate within the pipeline control unit 10 that is not a pressurized unit but can be converted into a pressurized unit by adding subcomponents to the structure for servicing. and upon completion of servicing of the gate the pipeline control unit 10 can be returned to a non-pressurized support structure for a gate.

The method includes the step of a valve-servicing assembly of which the isolation valve assembly is a part such that the isolation valve assembly has first and second ends and a size large enough to enable a user to remove the gate from the access opening through the isolation valve assembly, the valve-servicing assembly including a chamber-defining structure connected to the second end of the isolation valve assembly that defines a chamber in which the gate fits. The method proceeds by connecting the first end of the isolation valve assembly to the access opening of the valve body in a position over the access opening, providing a pressure cover plate installed over the access opening to allow pressurization.

Retract the traveling member or members to disconnect the restraining compression and release the fluid tight seal.

Based on the foregoing descriptions, one of ordinary skill in the art can readily practice the invention and incorporate various changes without departing from the scope of the claims. The strongback and side members (17 and 18), for example, can be manufactured from any of various materials, including ductile iron, cast iron, stainless steel, brass and composites though plastics, rubber, polyethylene and composites and any various flexible materials can be used. The size can range from 1 inch (2.5 cm) diameter or less to a 144 inch (366 cm) diameter or more. In addition, the first and second ends of the valve body can be configured so that a user can readily connect each end to a respective one of separate first and second pipeline sections, either directly or via intermediate fittings using any of various known connection means. These could include flanged, mechanical joint, fusion, glue, pipe threads, solder, welded, compression and push-in fittings and groove locking methods including cam locks.

Although the present invention has been described in considerable detail with reference to certain preferred embodiments, other embodiments are possible. The steps disclosed for the present methods, for example, are not intended to be limiting nor are they intended to indicate that each step is necessarily essential to the method, but instead are exemplary steps only. Therefore, the scope of the appended claims should not be limited to the description of preferred embodiments contained in this disclosure. All references cited herein are incorporated by reference in their entirety.

What is claimed is:

1. A pipeline control unit, comprising:
(a) a housing having an interior compartment, comprising:
a left side internal wall having an inner face, an outer face, a top, a bottom, a front side, and a rear side, wherein the left side internal wall further comprises a left side conduit having an interior surface and an exterior surface, and wherein the left side conduit extends outwardly from the outer face of the left side internal wall and communicates with the interior compartment through an opening in the inner face of the left side internal wall;
a right side internal wall having an inner face, an outer face, a top, a bottom, a front side, and a rear side, wherein the right side internal wall further comprises a right side conduit having an interior surface and an exterior surface, and wherein the right side conduit extends outwardly from the outer face of the right side internal wall and communicates with the interior compartment through an opening in the inner face of the right side internal wall;
a front side wall having a top, a bottom, a right side and a left side, wherein the left side of the front side wall is connected to the left side internal wall and the right side of the front side wall is connected to the right side internal wall; and
a rear side wall having a top, a bottom, a right side and a left side, wherein the left side of the rear side wall is connected to the left side internal wall and the right side of the rear side wall is connected to the right side internal wall;
(b) a left side strongback having an inner face, an outer face, a top, a bottom, a front side, and a rear side, wherein the inner face of the left side strongback faces the outer face of the left side internal wall, and wherein a peripheral portion of the inner face of the left side strongback is in contact with the outer face of the left side internal wall, the left side strongback further comprising:
a central aperture extending between the inner face and the outer face of the left side strongback, the aperture having an interior surface which extends around the exterior surface of the left side conduit;
a receptacle in the inner face of the left side strongback between the central aperture and the peripheral portion of the inner face; and
(c) a right side strongback having an inner face, an outer face, a top, a bottom, a front side, and a rear side, wherein the inner face of the right side strongback faces the outer face of the right side internal wall, and wherein a peripheral portion of the inner face of the right side strongback is in contact with the outer face of the right side internal wall, the right side strongback further comprising a central aperture extending between the inner face and the outer face of the right side strongback, the aperture having an interior surface which extends around the exterior surface of the right side conduit;
(d) a first traveling member in the receptacle of the left side strongback, the first traveling member having an outer face and an inner face; and
(e) pressure rods extending from the outer face of left side strongback to the outer face of the travelling member, wherein the pressure rods are capable of exerting pressure against the outer face of the first travelling member and thereby place pressure against the outer face of the left side internal wall in order to retain a gate placed in the interior compartment of the pipeline control unit.

2. The pipeline control unit of claim 1, wherein the right side strongback comprises a receptacle in the inner face of the right side strongback between the central aperture and the peripheral portion of the inner face, further comprising:

a second traveling member in the receptacle of the right side strongback, the second traveling member having an outer face and an inner face; and pressure rods extending from the outer face of right side strongback to the outer face of the second travelling member, wherein the pressure rods are capable of exerting pressure against the outer face of the second travelling member and thereby place pressure against the outer face of the right side internal wall in order to retain the gate placed in the interior compartment of the pipeline control unit.

3. The pipeline control unit of claim 1, wherein the pressure rods are screws.

4. The pipeline control unit of claim 1, wherein the gate is selected from the group consisting of a gate valve, a metal gate, a rubber coated gate, a check valve, a butterfly valve, a plug, a ball valve, an orifice plate, and a safety screen.

5. The pipeline control unit of claim 1, further comprising a lower access opening attached to the bottom of each of the rear side wall, the front side wall, the left side internal wall, and the right side internal wall of the housing and forming a fluid tight seal with the housing.

6. The pipeline control unit of claim 5, wherein the lower access opening is reversibly secured to the housing.

7. The pipeline control unit of claim 1, wherein the left side internal wall and right side internal wall are formed from a flexible material.

8. The pipeline control unit of claim 7, wherein the flexible materials are selected from the group consisting of fiberglass, polytetrafluoroethylene (PTFE), high-density polyethylene (HDPE), and polyvinyl chloride (PVC).

9. The pipeline control unit of claim 1, wherein the left side strongback and right side strongback are formed from a rigid material.

10. The pipeline control unit of claim 9, wherein the rigid material is selected from the group consisting of carbon steel, stainless steel, and brass.

11. The pipeline control unit of claim 1, further comprising an upper access opening attached to the top of each of the rear side wall, the front side wall, the left side internal wall, and the right side internal wall of the housing and forming a fluid tight seal with the housing.

12. The pipeline control unit of claim 1, wherein an upper access opening is reversibly secured to the housing.

13. The pipeline control unit of claim 1, wherein the left side internal wall is integrally formed with the left side conduit and the right side internal wall is integrally formed with the right side conduit.

14. The pipeline control unit of claim 1, wherein the front side wall is integrally formed with the left side internal wall or the right side internal wall.

15. The pipeline control unit of claim 1, wherein the rear side wall is integrally formed with the left side internal wall or the right side internal wall.

* * * * *